(12) United States Patent
Engler

(10) Patent No.: US 8,849,737 B1
(45) Date of Patent: Sep. 30, 2014

(54) PREDICTION METHOD OF PREDICTING A FUTURE STATE OF A SYSTEM

(75) Inventor: Joseph J. Engler, Coggon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 309 days.

(21) Appl. No.: 13/051,672

(22) Filed: Mar. 18, 2011

(51) Int. Cl.
*G06N 5/02* (2006.01)
*G06N 3/12* (2006.01)

(52) U.S. Cl.
CPC ... *G06N 5/02* (2013.01); *G06N 3/12* (2013.01)
USPC ............................................. 706/46; 706/13

(58) Field of Classification Search
None
See application file for complete search history.

(56) References Cited

U.S. PATENT DOCUMENTS

| | | | |
|---|---|---|---|
| 6,909,198 B2 | 6/2005 | Ragwitz et al. | |
| 6,975,925 B1 | 12/2005 | Barnes et al. | |
| 7,047,169 B2 | 5/2006 | Pelikan et al. | |
| 7,272,584 B2 | 9/2007 | Diedrich et al. | |
| 7,403,854 B1 | 7/2008 | Hurley et al. | |
| 7,797,259 B2 * | 9/2010 | Jiang et al. | 706/21 |
| 7,822,582 B2 | 10/2010 | Mertins et al. | |
| 7,942,634 B2 | 5/2011 | Christensen | |
| 8,041,417 B2 * | 10/2011 | Jonckheere et al. | 600/516 |
| 8,050,899 B2 | 11/2011 | Giguere et al. | |
| 8,060,340 B2 | 11/2011 | Gao et al. | |
| 8,105,781 B2 | 1/2012 | Podgoreanu et al. | |
| 8,150,641 B2 | 4/2012 | Morjaria et al. | |
| 8,185,331 B2 | 5/2012 | Parikh et al. | |
| 8,200,435 B2 | 6/2012 | Stiesdal | |
| 8,202,048 B2 | 6/2012 | Stiesdal et al. | |
| 8,265,798 B2 | 9/2012 | Imes | |
| 8,272,265 B2 | 9/2012 | Bucher et al. | |
| 8,290,634 B2 | 10/2012 | Larsen et al. | |
| 8,332,077 B2 | 12/2012 | Kondo et al. | |
| 2002/0029097 A1 | 3/2002 | Pionzio et al. | |
| 2003/0160457 A1 | 8/2003 | Ragwitz et al. | |
| 2004/0009063 A1 | 1/2004 | Polacsek | |
| 2007/0067067 A1 | 3/2007 | Stommel | |
| 2007/0112698 A1 | 5/2007 | McArdle | |
| 2007/0124025 A1 | 5/2007 | Schram et al. | |

(Continued)

FOREIGN PATENT DOCUMENTS

WO WO 2011/014712 2/2011

OTHER PUBLICATIONS

Kennel, Matthew B. et al.; "Determining embedding dimension for phase-space reconstruction using a geometrical construction"; 1992; The American Physical Society; Physical Review A, vol. 45, No. 6; pp. 3403-3411.*

(Continued)

*Primary Examiner* — Stanley K Hill
(74) *Attorney, Agent, or Firm* — Donna P. Suchy; Daniel M. Barbieri

(57) ABSTRACT

A method of predicting at least one future state of a system is provided. The method comprises embedding, using a phase space embedding module, time series data relating to the system within a reconstructed phase space. The phase space embedding module comprises instructions stored on a non-transitory computer-readable medium that are executable by a processor. The method further comprises predicting, using a prediction module, the at least one future state of the system based on a rate of separation of trajectories of the embedded data within the reconstructed phase space. The prediction module comprises instructions stored on the non-transitory computer-readable medium that are executable by the processor.

14 Claims, 4 Drawing Sheets

(56) References Cited

U.S. PATENT DOCUMENTS

| | | |
|---|---|---|
| 2008/0183648 A1 | 7/2008 | Goldberg et al. |
| 2008/0195255 A1 | 8/2008 | Lutze et al. |
| 2009/0060740 A1 | 3/2009 | Stiesdal et al. |
| 2009/0100293 A1 | 4/2009 | LaComb et al. |
| 2009/0143871 A1 | 6/2009 | Gao et al. |
| 2009/0259521 A1* | 10/2009 | Yitts .............................. 705/10 |
| 2009/0295165 A1 | 12/2009 | Giguere et al. |
| 2009/0299780 A1 | 12/2009 | Sarkar et al. |
| 2009/0327178 A1 | 12/2009 | Jacobson |
| 2010/0094474 A1 | 4/2010 | Larsen et al. |
| 2010/0117361 A1 | 5/2010 | Christensen |
| 2010/0133848 A1 | 6/2010 | Piasecki |
| 2010/0138182 A1 | 6/2010 | Jammu et al. |
| 2010/0148712 A1 | 6/2010 | Klatt |
| 2010/0204844 A1 | 8/2010 | Rettger et al. |
| 2010/0263167 A1 | 10/2010 | Fox |
| 2010/0280673 A1 | 11/2010 | Woste |
| 2011/0004356 A1 | 1/2011 | Garcia |
| 2011/0106324 A1 | 5/2011 | Tsadka et al. |
| 2011/0149268 A1 | 6/2011 | Marchant et al. |
| 2011/0202191 A1 | 8/2011 | Larsson et al. |
| 2011/0224926 A1 | 9/2011 | Morjaria et al. |
| 2011/0226892 A1 | 9/2011 | Crowther et al. |
| 2011/0245990 A1 | 10/2011 | Rasmussen |
| 2011/0307109 A1 | 12/2011 | Sri-Jayantha |
| 2012/0049516 A1 | 3/2012 | Viassolo |
| 2012/0059638 A1 | 3/2012 | Garate Ivaro |
| 2012/0078814 A1* | 3/2012 | Clark et al. ................. 705/36 R |
| 2012/0169053 A1 | 7/2012 | Tchoryk et al. |
| 2013/0035798 A1 | 2/2013 | Zhou et al. |
| 2013/0046492 A1 | 2/2013 | Westergaard |
| 2013/0102379 A1 | 4/2013 | Sargent et al. |
| 2013/0121548 A1 | 5/2013 | Kovalan et al. |

OTHER PUBLICATIONS

Zhang, Jun et al.; "Time series prediction using Lyapunov exponents in embedding phase space"; 2004; Elsevier; Computers and Electrical Engineering 30 (2004); pp. 1-15.*
Lei, Dong et al.; "Prediction of Wind Power Generation based on Chaotic Phase Space Reconstruction Models"; 2007; Power Electronics and Drive Systems, 2007; pp. 744-748.*
U.S. Appl. No. 13/051,717, filed Mar. 18, 2011, Rockwell Collins, Inc.
U.S. Appl. No. 13/051,751, filed Mar. 18, 2011, Rockwell Collins, Inc.
U.S. Appl. No. 13/051,787, filed Mar. 18, 2011, Rockwell Collins, Inc.
U.S. Appl. No. 13/051,835, filed Mar. 18, 2011, Rockwell Collins, Inc.
U.S. Appl. No. 13/051,849, filed Mar. 18, 2011, Rockwell Collins, Inc.
Bookstaber, A Recessive/Dominant Genetic Algorithm, 2003, 11 pages.
Giebel, The State-of-the-Art in Short-Term Prediction of Wind Power, A Literature Overview, Version 1.1, Project ANEMOS, Contract No. ENK5-CT-2002-00665, Aug. 2003, 36 pages.
Kusiak et al., Analysis of Wind Turbine Vibrations based on SCADA Data, Journal of Solar Energy Engineering, 2009, 13 pages.
Kusiak et al., Anticipatory Control of Wind Turbines with Data-Driven Predictive Models, IEEE Transactions on Energy Conversion, Sep. 2009, 9 pages.
Kusiak et al., Prediction of Status Patterns of Wind Turbines: A Data-Mining Approach, Journal of Solar Energy Engineering, Feb. 2011, 10 pages.
Kusiak et al., Short-Horizon Prediction of Wind Power: A Data-Driven Approach, IEEE Transactions on Energy Conversion, Dec. 2010, 11 pages.
Kusiak et al., Short-Term Prediction of Wind Farm Power: A Data Mining Approach, IEEE Transactions on Energy Conversion, Mar. 2009, 12 pages.
Saad-Saound et al., Models for Predicting Flicker Induced by Large Wind Turbines, IEEE Transactions on Energy Conversion, Sep. 1999, 6 pages.
Schnier et al., Dominant and Recessive Genes in Evolutionary Systems Applied to Spatial Reasoning, University of Sydney, Key Centre of Design Computing, 1997 10 pages.
Sedighizadeh et al., A Self-Tuning PID Control for a Wind Energy Conversion System Based on the Lyapunov Approach, Universities Power Engineering Conference, Sep. 2008, 6 pages.
Tian-Hua et al., Study on the Turntable Hydraulic Variable Structure Control Based on Lyapunov Theory, 2009 International Conference on Measuring Technology and Mechatronics Automation, Apr. 2009, 6 pages.
Yanning et al., Wind Speed Predicted by Wavelet Analysis in Input Prediction Control of Wind Turbine, Proceedings of the 7th World Congress on Intelligent Control and Automation, Jun. 2008, 4 pages.
Zheng et al., Prediction of Wind Farm Power Ramp Rates: A Data-Mining Approach, Journal of Solar Engineering, 2009, 9 pages.
Office Action for U.S. Appl. No. 13/051,787, mail date Jun. 20, 2013, 16 pages.
Notice of Allowance for U.S. Appl. No. 13/051,717, mail date Mar. 28, 2013, 19 pages.
Notice of Allowance for U.S. Appl. No. 13/051,835, mail date Jun. 11, 2013, 11 pages.
Notice of Allowance for U.S. Appl. No. 13/051,849, mail date Apr. 1, 2013, 12 pages.
Engler et al., Agent-Based Control of Thermostatic Appliances, Green Technologies Conference, 2010 IEEE, Apr. 15-16, 2010, 5 pages.
Engler, Optimization of Test Engineering Utilizing Evolutionary Computation, Autotestcon, 2009 IEEE, Sep. 14-17, 2009, 6 pages.
Goldberg et al., Nonstationary Function Optimization Using Genetic Algorithm with Dominance and Diploidy, Proceedings of the Second International Conference on Genetic Algorithms on Genetic Algorithms and Their Application, 1987, 11 pages.
Kominami et al., A New Genetic Algorithm with Diploid Chromosomes Using Probability Decoding for Adaption to Various Environments, Electronics and Communications in Japan, 2010, 9 pages.
Papadopoulos et al., Engineering Failure Analysis and Design Optimisation with Hip-Hops, Engineering Failure Analysis, Mar. 2011, 19 pages.
Sheth et al., Evolving Agents for Personalized Information Filtering, IEEE, 1993, 8 pages.
Wu et al., A Diploid Genetic Approach to Short-Term Scheduling of Hydro-Thermal System, IEEE Transactions on Power Systems, 2000, 7 pages.
Office Action for U.S. Appl. No. 13/224,648, mail date Jul. 22, 2013, 17 pages.
Notice of Allowance for U.S. Appl. No. 13/051,787, mail date Sep. 26, 2013, 8 pages.
Non-Final Office Action on U.S. Appl. No. 13/051,751 Dated Jul. 2, 2014, 9 pages.

* cited by examiner

PREDICTION METHOD OF PREDICTING A FUTURE STATE OF A SYSTEM

CROSS-REFERENCE TO RELATED APPLICATIONS

The present disclosure is related to U.S. patent application Ser. No. 13/051,835 (U.S. Pat. No. 8,583,572), titled "Explicit Diploid Evolutionary Control", U.S. patent application Ser. No. 13/051,849 (U.S. Pat. No. 8,494,990), titled "Random Emigrant Strategy for Explicit Diploid Evolutionary Control", U.S. patent application Ser. No. 13/051,751, titled "Diploid Control of Water Heaters", U.S. patent application Ser. No. 13/051,717 (U.S. Pat. No. 8,489,247), titled "Agent-Based Chaotic Control of Wind Turbines", and U.S. patent application Ser. No. 13/051,787 (U.S. Pat. No. 8,606,418), titled "Wind Prediction for Wind Farms Through the Use of Weather Radar", all of which were filed concurrently with the present application and all of which are incorporated herein by reference.

BACKGROUND

The present disclosure relates generally to the field of system prediction and analysis.

Systems are sometimes initially characterized as stochastic, or exhibiting random behavior, and are later found to be nonlinearly deterministic. Stochastic analysis and prediction methodologies may misclassify such nonlinearly deterministic systems and may be inefficient for use with such systems. Control and prediction systems in industrial applications (e.g., wind turbines) may be developed in the stochastic domain when sufficient deterministic prediction algorithms are unavailable. In some applications, deterministic prediction algorithms may be utilized but may be designed to smooth the deterministic nonlinearities, which may result in inefficient and/or inaccurate prediction.

SUMMARY

One embodiment of the disclosure relates to a method of predicting at least one future state of a system. The method comprises embedding, using a phase space embedding module, time series data relating to the system within a reconstructed phase space. The phase space embedding module comprises instructions stored on a non-transitory computer-readable medium that are executable by a processor. The method further comprises predicting, using a prediction module, the at least one future state of the system based on a rate of separation of trajectories of the embedded data within the reconstructed phase space. The prediction module comprises instructions stored on the non-transitory computer-readable medium that are executable by the processor.

Another embodiment of the disclosure relates to a system comprising an electronic processor configured to embed time series data relating to a system within a reconstructed phase space. The processor is further configured to predict at least one future state of the system based on a rate of separation of trajectories of the embedded data within the reconstructed phase space.

Another embodiment of the disclosure relates to a non-transitory computer-readable medium having instructions stored thereon. The instructions are executable by a processor to execute a method comprising embedding time series data relating to a system within a reconstructed phase space. The method further comprises predicting at least one future state of the system based on a rate of separation of trajectories of the embedded data within the reconstructed phase space.

DETAILED DESCRIPTION

Figure 1:
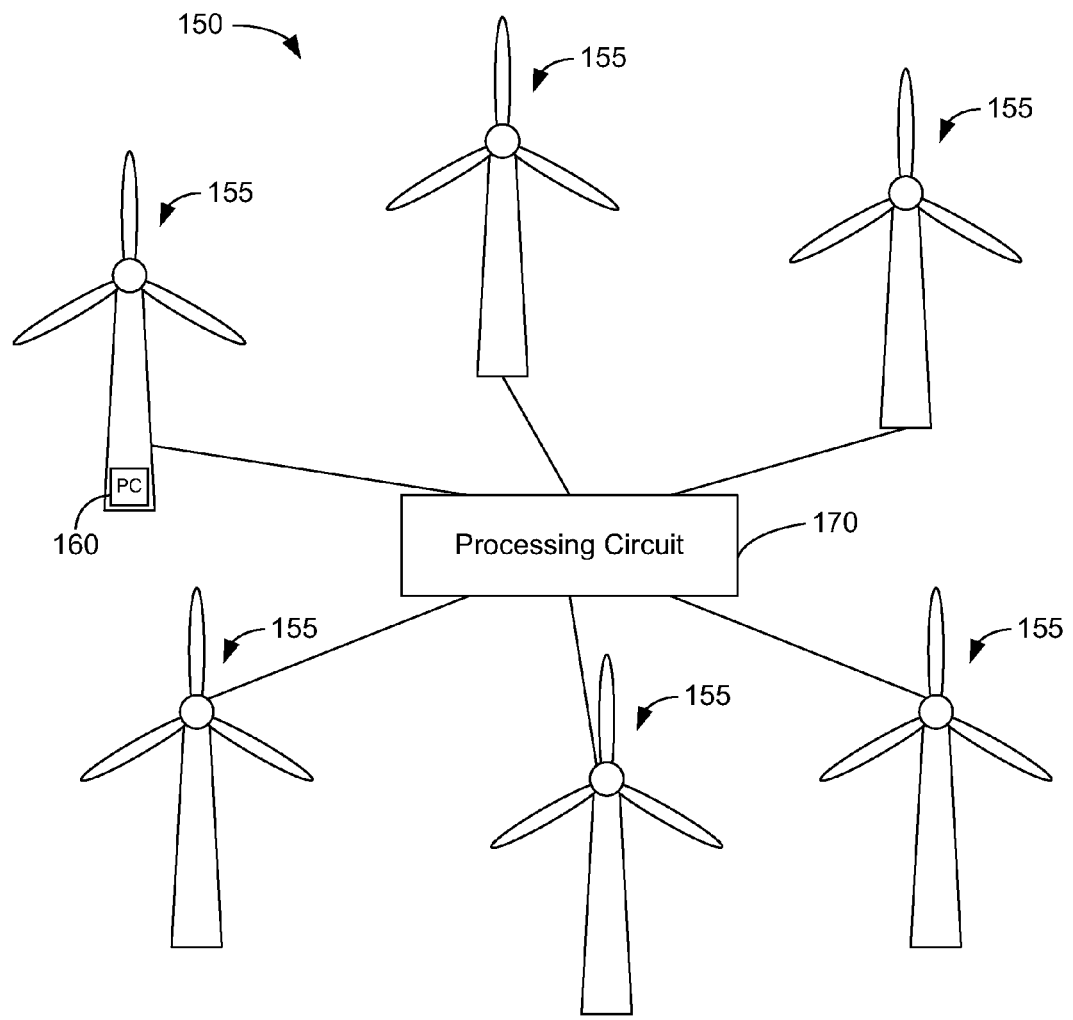
FIG. 1 is an illustration of a wind farm including a plurality of wind turbines controlled using a deterministic prediction method according to an exemplary embodiment.

Referring generally to the figures, systems and methods for analyzing and/or predicting the behavior of nonlinearly deterministic systems (e.g., systems that exhibit chaotic behavior) are disclosed according to various exemplary embodiments. Systems generally tend toward one of several eventual states, such as steady state (e.g., to a fixed point), periodic, random, or chaotic. Chaotic states are represented by a metric space that is finitely bounded while exhibiting an infinite or nearly infinite number or trajectories or orbits within the bound space. These trajectories do not revisit a point previously visited within the bounds of the metric space; if they did, the trajectories would be periodic as the equations of motion for the chaotic states are deterministic.

Prior methodologies for deterministic prediction of chaotic systems fail to take into account the exponential divergence/convergence of the system. For example, methods such as a nearest neighbor prediction and ellipsoid prediction make use of neighboring orbits of a system but do not consider that these orbits may diverge or converge at an exponential rate.

Exemplary systems and methods disclosed herein predict future states of a system based on the rate of separation of trajectories within an embedded phase space to accurately predict the future states. For example, some exemplary embodiments may be used to predict future states of a wind turbine or a group of wind turbines (e.g., a wind farm). In the context of wind turbine-related embodiments, the future states may relate to a predicted velocity of wind in the area of the wind turbines, predicted load on the wind turbines, predicted electrical power output of the wind turbines, and/or any other type of data relating to the wind turbines.

Predicting the future states of a system may include embedding time series data relating to the system within a reconstructed phase space. Time series data includes a series or sequence of data points, each of which is measured at and/or associated with a particular point in time. In some embodiments, time series data may be measured at regular periodic time intervals (e.g., 10 milliseconds, one second, 30 seconds, one minute, 15 minutes, one hour, one day, etc.). In the context of wind turbine-related embodiments, the time series data may represent wind speed or velocity, the load applied to the wind turbines, the electrical power output of the wind turbines, and/or other wind turbine-related data measured at a series of different times. For example, in one embodiment, the time series data may include wind velocity data for wind in the area of a wind turbine measured at 30 second intervals for a period of five minutes. The time series data can be used to reconstruct a phase space representation of various states of the system, and futures states of the system may be predicted based on the separation of trajectories of the embedded time series data within the reconstructed phase space. For example, the electrical power output of a wind turbine or wind farm at a particular time or range of times may be predicted based on time series data relating to wind velocity or electrical power output of the wind turbine(s) that is embedded in the reconstructed phase space.

Referring to FIG. 1, a wind farm 150 including a plurality of wind turbines 155 controlled using a deterministic prediction method is shown according to an exemplary embodiment. Wind farm 150 is merely one example of a type of system that may be predicted and/or controlled using the systems and methods disclosed here. Wind farms and wind turbines are examples of systems that may display chaotic behavior.

In some embodiments, a processing circuit 160 associated with a single wind turbine 155 may receive input data relating to a state of the wind turbine 155 and may use the data to predict future states of the wind turbine 155 using methods disclosed herein. Processing circuit 160 may be configured to utilize one or more adjustable set points to determine the structural load that should be applied in wind turbine 155 to generate electrical energy. The set points may be used in conjunction with a power prediction schema that predicts the power to be generated by wind turbine 155 over a particular time period (e.g., a 24 hour period). In some embodiments, if wind is available during a time in which wind turbine 155 was not predicted to run, processing circuit 160 may disable wind turbine 155 from operating to ensure power grid stability.

In other embodiments, part or all of wind farm 150 may be monitored by a central processing circuit 170 configured to receive input data relating to a state of several wind turbines and predict future states of the wind turbines and/or the wind farm 150 using methods disclosed herein. In such embodiments, central processing circuit 170 may be configured to account for the impact individual turbines may have on other turbines in wind farm 150. For example, one turbine may generate a wake that affects the operation of other neighboring turbines in wind farm 150. Central processing circuit 170 may be configured to operate the wind turbines in wind farm 150 in a manner that reduces the effect that the wakes from the turbines have on other neighboring turbines to reduce the structural loads on the neighboring turbines.

Some exemplary embodiments may achieve an accuracy of 0.02 percent or less error (e.g., over 100 ten minute intervals for wind turbine generator speed and wind turbine fault prediction). In various other exemplary embodiments, systems and methods disclosed herein may be used to control and/or predict future states of various other types of systems in fields such as medicine (e.g., complex organs such as the heart and brain), trading market forecasting, civil and military cyber security, environmental systems, human behavior, and/or other types of systems.

Figure 2:
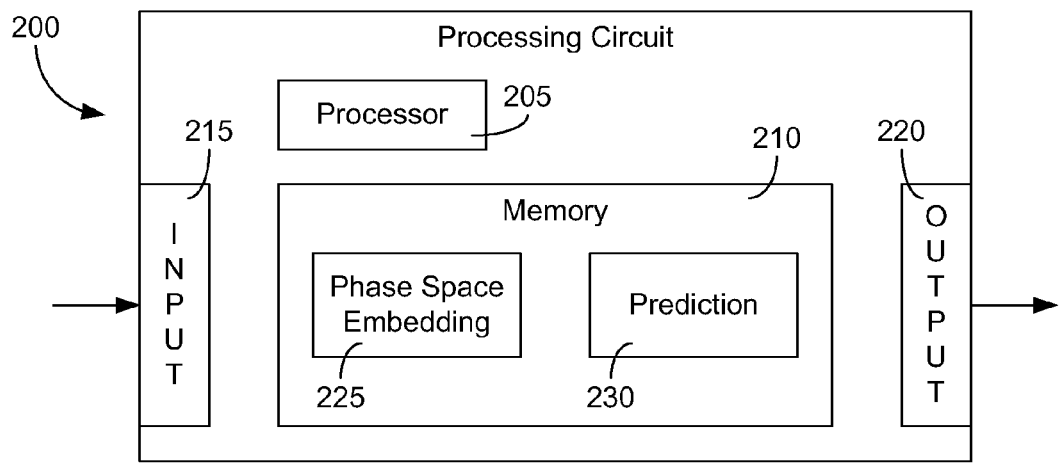
FIG. 2 is a block diagram of a processing circuit configured to predict the behavior of a system using a deterministic method according to an exemplary embodiment.

Referring now to FIG. 2, a block diagram of a processing circuit 200 (e.g., an electronic processor) configured to predict the behavior of a system using a deterministic method is shown according to an exemplary embodiment. Processing circuit 200 includes at least one processor 205, which may be any general purpose or special purpose processor (e.g., FPGA, CPLD, ASIC, etc.). In some embodiments, processor 205 may be chosen based on the type of application with which processing circuit 200 is being utilized. Processing circuit 200 also includes a memory 210 that may be any type of computer or machine-readable media (e.g., hard drive, flash memory, ROM, RAM, EEPROM, CD, DVD, etc.). Processing circuit 200 may also include an input interface 215 for receiving input data relating to the system or process being controlled and an output interface 220 for outputting signals used to control the system or process. In some embodiments, processing circuit 200 may be networked to one or more other processing circuits. In some embodiments, processing circuit 200 and one or more other processing circuits may be employed to perform various operations (e.g., in a distributed computing environment).

Memory 210 may be configured to store one or more modules having instructions that are executable by processor 205. For example, memory 210 may include a phase space embedding module 225 configured to generate a reconstructed phase space and embed time series data for a system being predicted within the reconstructed phase space. Once the reconstructed phase space has been generated and the data has been embedded in the reconstructed phase space, one or more future states of the system may be predicted using a prediction module 310. Prediction module 310 may be configured to predict the future states based on a rate of separation of trajectories in the embedded phase space (e.g., a rate of divergence or convergence of the trajectories).

Figure 3:
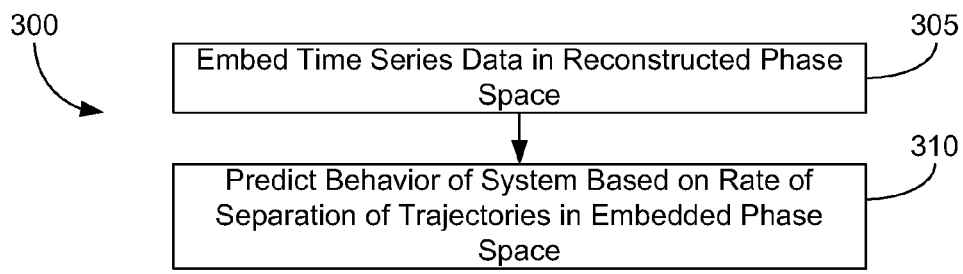
FIG. 3 is a flow diagram of a process for predicting the behavior of a system using a deterministic method according to an exemplary embodiment.

Referring now to FIG. 3, a flow diagram of a process 300 for predicting the behavior of a system using a deterministic method according to an exemplary embodiment. Process 300 may be implemented using a deterministic algorithm executed by a processing circuit (e.g., processing circuit 200).

At step 305, time series data relating to a system being predicted is received and embedded within a reconstructed phase space. The time series data may be data relating to one or more aspects of the system being predicted that is measured at regular intervals. Time series data includes a series or sequence of data points, each of which is measured at and/or associated with a particular point in time. In some embodiments, time series data may be measured at regular periodic time intervals (e.g., 10 milliseconds, one second, 30 seconds, one minute, 15 minutes, one hour, one day, etc.). In the context of wind turbine-related embodiments, for example, the time series data may represent wind speed or velocity, the load applied to the wind turbines, the electrical power output of the wind turbines, and/or other wind turbine-related data measured at a series of different times.

The time series data is used to reconstruct a phase space representation of various states of the system. According to an exemplary embodiment, reconstruction of the phase space may be done using several metrics, including a time delay metric and a minimum embedding dimension. The time delay metric represents a time delay or time lag used to construct a new set of coordinates in the newly reconstructed phase space. The minimum embedding dimension represents a minimum number of dimensions that may be used to reconstruct, or unfold, the new phase space (e.g., the metric phase space) back to a multivariate phase space that is representational of the original phase. Once the time delay metric and minimum embedding dimension have been determined, a metric representing the rate of separation of trajectories in the new embedded phase space may be determined. In some embodiments, this metric may be a maximum Lyapunov exponent of the nonlinear system.

At step 310, the behavior of the nonlinear system (e.g., one or more future states of the nonlinear system) is predicted based on the rate of separation of trajectories in the embedded phase space. Future states of the system may be predicted by identifying a point in the reconstructed phase space as a current state of the system, finding one or more close points in the embedded phase space, and predicting a new state point based on the magnitude and/or direction of the maximum Lyapunov exponent of the system. In some embodiments, the new state point may be predicted based on a single nearest neighbor point identified in the embedded phase space. The new state point may be embedded within the embedded time series in the reconstructed phase space, and step 310 may be used to predict further future states of the nonlinear system.

Figure 4A:
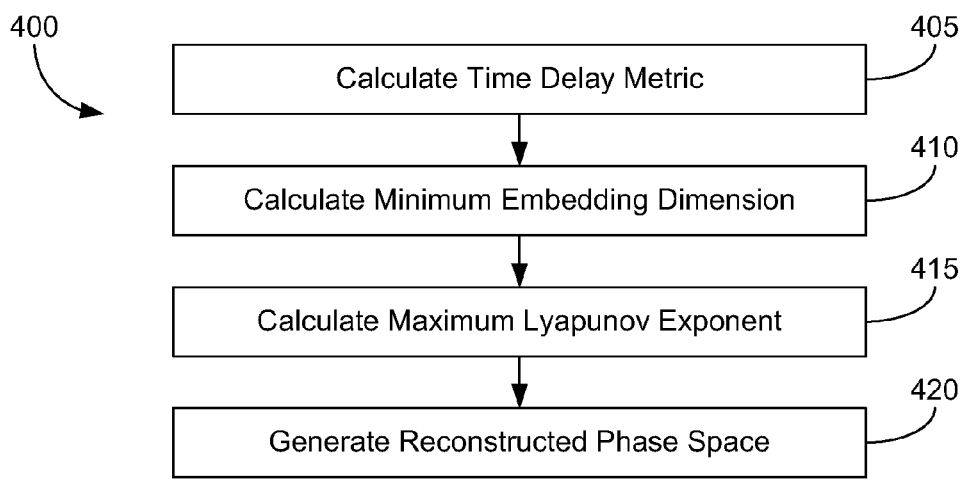
FIG. 4A is a flow diagram of a process for embedding data within a reconstructed phase space according to an exemplary embodiment.

Referring now to FIG. 4A, a flow diagram of a process 400 for reconstructing a phase space and embedding time series data in the reconstructed phase space is shown according to an exemplary embodiment. One or more steps of process 400 may be performed, for example, as part of step 305 of process 300. At step 405, a time delay metric, or delay factor, for use in embedding time series data within the reconstructed phase space is determined. The time delay metric represents a time delay or time lag used to construct a new set of coordinates in the newly reconstructed phase space. In some embodiments, a time delay metric $\tau$ may be calculated to be the first value for which an autocorrelation function (e.g., representing a cross-correlation of the time series data signal with itself as a function of time separation) falls below 1/e. The autocorrelation function may be represented as follows:

$$r_\tau = \frac{\sum_{t=\tau+1}^{n} (x_t - \bar{x})(x_{t-\tau} - \bar{x})}{\sum_{t=1}^{n} (x_t - \bar{x})^2}$$

In the above, $\bar{x}$ is the mean of the time series data, $x_t$ is the value of the data point x at time t, and r is the autocorrelation coefficient.

At step 410, a minimum embedding dimension for the reconstructed phase space may be determined. The minimum embedding dimension represents a minimum number of dimensions that may be used to reconstruct, or unfold, the new phase space (e.g., the metric phase space) back to a multivariate phase space that is representational of the original phase. A scalar time series for a given variable of the nonlinear system may be represented by the expression $x(n_i) = \{x_0, x_{0+\tau}, x_{0+2\tau}, \ldots, x_{0+(d-1)\tau}\}$. The time delay factor $\tau$ may be calculated from the autocorrelation of the variable as described above with respect to step 405. The symbol d in the scalar time series expression for the variable x above is the minimal embedding dimension for which the scalar time series is most representational of the original phase space.

In some embodiments, a False Nearest Neighbors ("FNN") methodology may be used to calculate the minimum embedding dimension d. A FNN methodology is a procedure for obtaining the minimum embedding dimension for phase space reconstruction based on the neighborhood of points whose distance is below a given threshold $\epsilon$. Consider a point x(n) and a point $x^r(n) \in U(x(n))$ which is the $r^{th}$ nearest neighbor of x(n) in the neighborhood of points around x(n). The distance between these two points in d dimensional space may be calculated as follows:

$$R_d^2(n, r) = \sum_{k=0}^{d-1} (n + k\tau) - x^r(n + k\tau)^2$$

In the above, $\tau$ is the time delay factor from the autocorrelation function. In some embodiments, all points within the neighborhood of x(n) (e.g., within the threshold distance $\epsilon$) may be calculated.

The embedding dimension is then increased from dimension d to dimension d+1 such that, by time delay embedding, the (d+1)th coordinate is added to each of the vectors x(n). After the dimension is increased, the distance of each point $x'(n) \in U(x(n))$ to x(n) is again calculated. Those points whose distance to x(n) is larger than $\epsilon$ are removed from the neighborhood U(x(n)). The removed points are considered false nearest neighbors to x(n) since they were nearest neighbors in the smaller embedding dimension but are not nearest neighbors to x(n) when the embedding dimension is expanded. In some embodiments, the proper embedding dimension d is determined to be the smallest embedding dimension d in which no false nearest neighbors are discovered. In other embodiments, the proper embedding dimension d may be determined to be the embedding dimension d in which the number of false nearest neighbors discovered is less than a certain maximum threshold of false nearest neighbors.

Figure 4B:
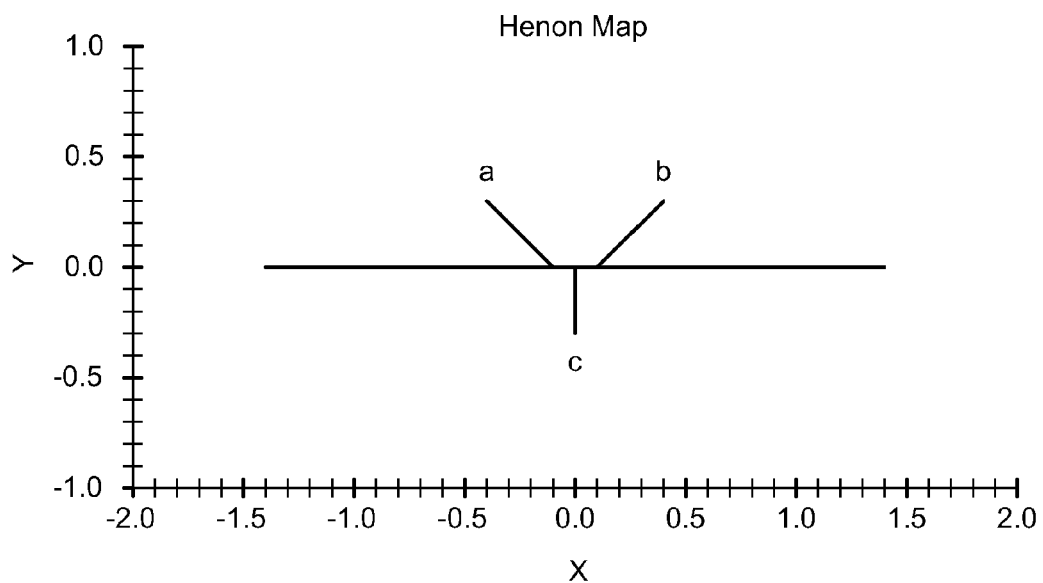
FIGS. 4B and 4C are Henon maps associated with a reconstruction of an example phase space using different embedding dimensions according to an exemplary embodiment.
Figure 4C:
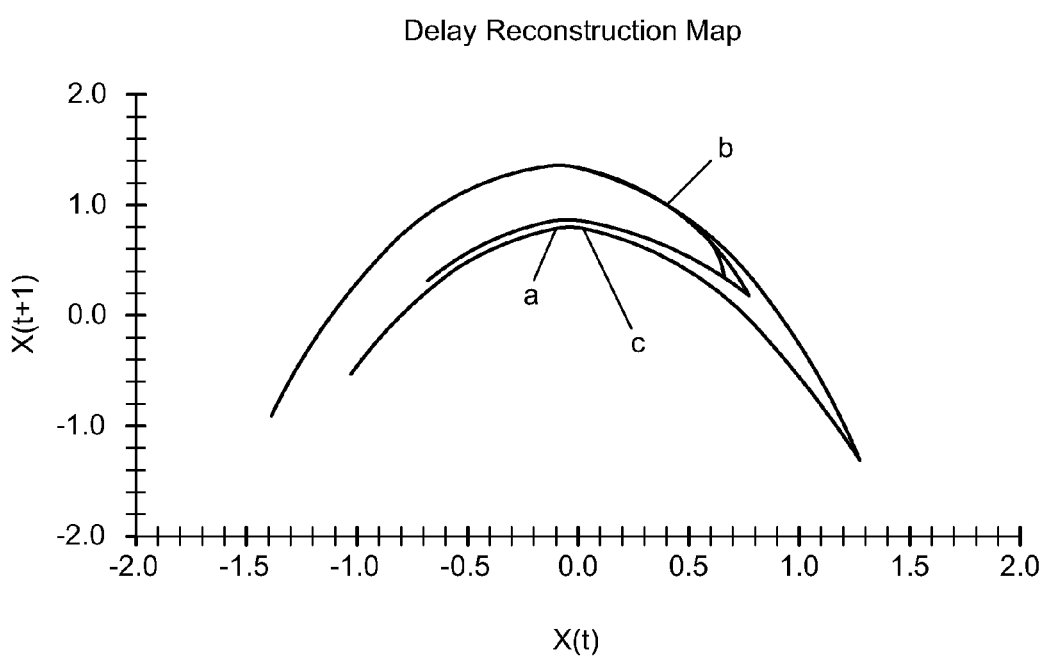

The operation of the FNN method may be illustrated with reference to FIGS. 4B and 4C. FIG. 4B illustrates a Henon map associated with a reconstruction of an exemplary phase space using only an x variable. For d=1, the reconstructed scalar phase space is a line. In d=1 dimension embedding space two points a and b are illustrated as being close to a point c. These points are nearest neighbors of c. However, when the embedding dimension d is increased to d=2, as illustrated in FIG. 4C, point a remains close to point c but point b is no longer in the neighborhood of point c. Point b was a false neighbor of point c in d=1 dimension embedding space due to the constriction of the embedding space.

Referring again to FIG. 4A, at step 415, a maximum Lyapunov exponent of the system is calculated. The maximum Lyapunov exponent is a measure of the rate of separation (e.g., divergence or convergence) of trajectories or orbits in the reconstructed phase space. Two trajectories $x(n_1)$ and $y(n_1)$ in the reconstructed phase space may be represented as follows:

$$x(n_i) = \{x_0, x_{0+\tau}, x_{0+2\tau}, \ldots, x_{0+(d-1)\tau}\}$$

$$y(n_i) = \{y_0, y_{0+\tau}, y_{0+2\tau}, \ldots, y_{0+(d-1)\tau}\}$$

The distance between $x(n_1)$ and $y(n_1)$ may be represented by a value $\epsilon$ (e.g., a small value). The distance between the trajectories at some time $\Delta n$ in the future may be represented by the following:

$$\varepsilon_{\Delta n} = \|x_{n_1 + \Delta n} - y_{n_1 + \Delta n}\|$$

The maximum Lyapunov exponent $\lambda$ of the trajectories for the selected variable may be determined as follows:

$$\varepsilon_{\Delta n} \cong \varepsilon_0 e^{\lambda \Delta n} \text{ or}$$

$$\lambda = \lim_{n \to \infty} \frac{1}{n} \sum_{n}^{\infty} \ln\left(\frac{\|x_{n_1+\Delta n} - y_{n_1+\Delta n}\|}{\|x_{n_1} - y_{n_1}\|}\right)$$

The above represents the maximum Lyapunov exponent λ of the trajectories as n approaches ∞. In some embodiments, a more accurate maximum Lyapunov exponent may be calculated to determine the degree of non-linearity with the system by using a time series analysis of the Lyapunov exponent. Consider a time series T and a neighborhood $U(x(n_1))$ about a point $x(n_1) \in T$, such that each point $y_{n1} \in U(x(n_1))$ has a distance from $x(n_1)$ of some small value ϵ. The Lyapunov exponent of the time series T can be calculated as follows:

$$\lambda \approx \frac{1}{N} \sum_{n_0=1}^{N} \ln\left(\frac{1}{|U(x(n_1))|} \sum_{y_n \in U(x(n_1))} |x_{n_0+\Delta n} - y_{n+\Delta n}|\right)$$

For λ<0, the trajectories are periodic and the system is not chaotic. For λ=0, the system approaches a marginally stable point. If λ>0, the two trajectories are diverging from one another at an exponential rate, the system is chaotic, and the degree of non-linearity of the system containing $x(n_1)$ and $y(n_1)$ may be estimated exponentially by the maximum Lyapunov exponent λ. For a given system, there are as many Lyapunov exponents as there are dimensions in the phase space of the system.

Referring still to FIG. 4A, at step 420, the reconstructed phase space may be generated. The reconstructed phase space may be generated by selecting one variable of the system and generating a set of d dimensional vectors of the form $\bar{x}=\{x_\tau, x_{\tau+d}, \ldots, x_{\tau+dm}\}$ where τ is the time delay calculated at step 405 and d is the minimum embedding dimension calculated at step 410. The Lyapunov exponent calculated at step 415 is indicative of the rate of divergence or convergence of the nearby trajectories in the embedded phase space. In some embodiments, this divergence or convergence may be visible in a plot of the embedded phase space. In other embodiments, higher dimension phase spaces may not be plotted. In such embodiments, the Lyapunov exponent may provide an understanding of the phase space that may be useful in the prediction of new future data points.

Figure 5A:
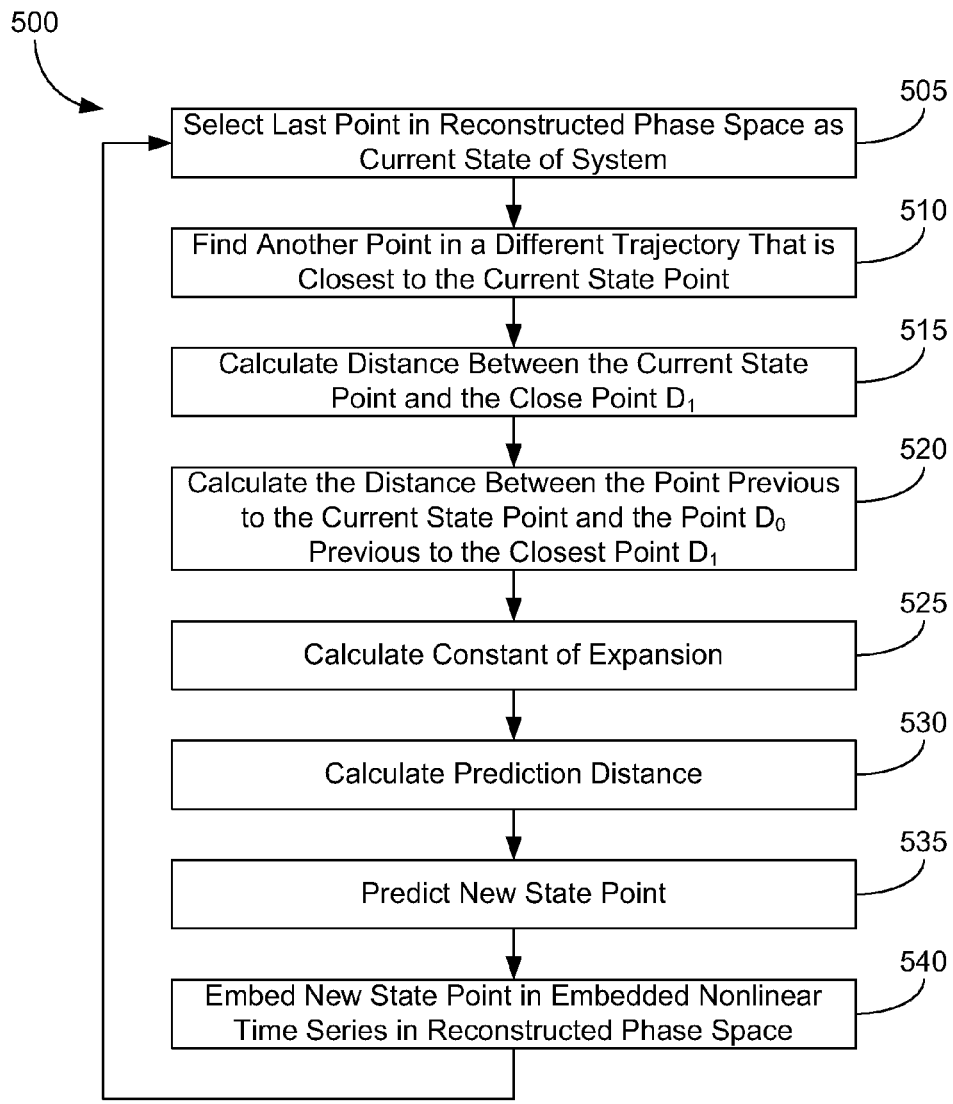
FIG. 5A is a flow diagram of a process for predicting the behavior of a system using data embedded within a reconstructed phase space according to an exemplary embodiment.

Referring now to FIG. 5A, a flow diagram of a process 500 for predicting the behavior (e.g., one or more future state points) of a system using data embedded within a reconstructed phase space is shown according to an exemplary embodiment. One or more steps of process 500 may be performed, for example, as part of step 310 of process 300. At step 505, a point (e.g., the last point) in the reconstructed phase space is selected as the current state of the system. At step 510, another point is located in a different trajectory than the selected current state point that is close (e.g., within a predefined distance), or closest, to the current state point. The close point may be determined using any distance metric, such as Euclidean Distance. In some embodiments, the close point may reside on an orbit external to that of the current state point. Whether or not the orbit resides on an orbit external to that of the current state point may be determined through a time delay of mean orbit length.

At step 515, the distance $D_1$ between the current state point and the close point is calculated. At step 520, the distance $D_0$ between the point previous (e.g., immediately previous) to the current state point on the trajectory of the current state point and a point previous to the closest point on the trajectory of the closest point is calculated. At step 525, a constant of expansion c is calculated based on $D_1$ and $D_0$, which may be calculated according to the following:

$$c = \frac{\ln|D_1 - D_0|}{\lambda}$$

Again, in the expression above, λ is the previously calculated Lyapunov exponent (e.g., at step 415 of process 400) relating to the rate of separation of trajectories in the system. At step 530, a prediction distance $D_p$ is calculated based on the determined constant of expansion c, which may be calculated according to the following:

$$D_p = D_1 + e^{c\lambda}$$

At step 535, a new future state point is predicted based on the determined prediction distance $D_p$. The new state point may be predicted to be a distance $D_p$ from the current state point in the direction of the maximum Lyapunov exponent λ. The direction of the maximum Lyapunov exponent λ may be determined by generating a neighborhood U around the closest point determined at step 510. The direction of the maximum Lyapunov exponent is in the direction of the major axis of the ellipsoidal hypersphere. In a chaotic system, the direction of the maximum Lyapunov exponent is the direction of divergence of the trajectory.

Figure 5B:
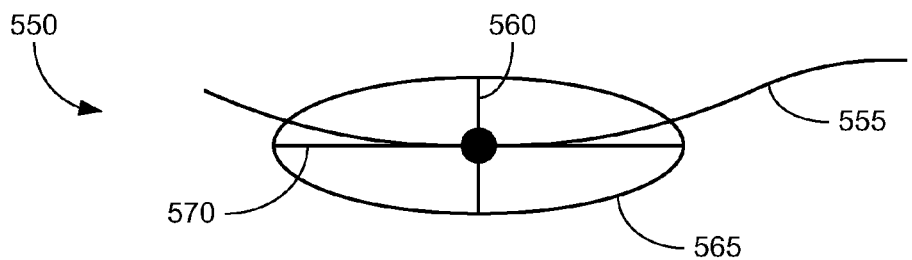
FIG. 5B is an illustration of a point on a trajectory and a neighborhood around the point according to an exemplary embodiment.

FIG. 5B illustrates an exemplary embodiment including a trajectory 555 with a closest point 560. The neighborhood U forms an ellipsoidal hypersphere 565 with the major axis as a tangent to the closest point. The predicted point utilizes the tangent of the closest point to determine its location within the embedded phase space. The tangent determines the first coordinate of the predicted point. The second coordinate is determined to be orthonormal to the tangent. The remaining coordinates correspond to the direction of the remaining axes whose length is that of their corresponding eigenvalues.

Referring again to FIG. 5A, at step 540, the new state point is embedded in the nonlinear time series in the reconstructed phase space. The new state point may then be used as the current state point and prediction may continue by repeating (e.g., iteratively) process 500. The length of predictability may depend on the magnitude of the Lyapunov exponent. The larger the Lyaponov exponent is, the shorter the accurate prediction time frame may become.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hard-wired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method comprising:
embedding, using a phase space embedding module, time series data relating to a system within a reconstructed phase space to provide embedded data, wherein the phase space embedding module comprises instructions stored on a non-transitory computer-readable medium that are executable by a processor;
predicting, using a prediction module, at least one future state of the system based on a rate of separation of trajectories of the embedded data within the reconstructed phase space; and
evaluating a fitness of solutions associated with a plurality of individuals of a population for controlling the system using a fitness function, each individual comprising a dominant genotype and a recessive genotype, wherein each genotype represents a solution of the solutions associated with the plurality of individuals for controlling the system, wherein the fitness function is based on the at least one future state of the system and is applied to the dominant genotype of each individual;
wherein predicting the at least one future state of the system based on the rate of separation of trajectories of the embedded data within the reconstructed phase space comprises predicting the at least one future state of the system based on a maximum Lyapunov exponent associated with the embedded data within the reconstructed phase space, and wherein the prediction module comprises instructions stored on the non-transitory computer-readable medium that are executable by the processor;
wherein predicting the at least one future state of the system based on the maximum Lyapunov exponent comprises:

selecting a current state point from the reconstructed phase space;
identifying a current close point in a different trajectory than the current state point, wherein the current close point is within a predefined distance of the current state point in the reconstructed phase space;
calculating a first distance between the current state point and the current close point;
calculating a second distance between a previous state point and a previous close point, wherein the previous state point is a point previous to the current state point on the trajectory of the current state point, wherein the previous close point is a point previous to the current close point on the trajectory of the current close point; and
predicting at least one future state point based on the first distance, the second distance, and the maximum Lyapunov exponent.

2. The method of claim 1, wherein the at least one future state of the system is predicted based on a magnitude and a direction of the maximum Lyapunov exponent.

3. The method of claim 1, wherein embedding the time series data within the reconstructed phase space comprises:
calculating a time delay factor;
calculating a minimum embedding dimension; and
embedding the time series data within the reconstructed phase space based on the time delay factor and minimum embedding dimension.

4. The method of claim 1, wherein embedding the time series data within the reconstructed phase space comprises calculating a minimum embedding dimension using a False Nearest Neighbors process.

5. The method of claim 1, further comprising:
setting, using the prediction module, the predicted at least one future state point as the current state point; and
predicting, using the prediction module, at least one additional future state point based on the future state point set as the current state point and the rate of separation of trajectories of the embedded data within the reconstructed phase space.

6. A system, comprising:
an electronic processor configured to
embed time series data relating to a system within a reconstructed phase space to provide embedded data;
predict at least one future state of the system based on a rate of separation of trajectories of the embedded data within the reconstructed phase space; and
evaluate a fitness of solutions associated with a plurality of individuals of a population for controlling the system using a fitness function, each individual comprising a dominant genotype and a recessive genotype, wherein each genotype represents a solution of the solutions associated with the plurality of individuals for controlling the system, wherein the fitness function is based on the at least one future state of the system and is applied to the dominant genotype of each individual;
wherein the processor is configured to predict the at least one future state of the system based on a maximum Lyapunov exponent associated with the embedded data within the reconstructed phase space by:
selecting a current state point from the reconstructed phase space;
identifying a current close point in a different trajectory than the current state point, wherein the current close point is within a predefined distance of the current state point in the reconstructed phase space;
calculating a first distance between the current state point and the current close point;
calculating a second distance between a previous state point and a previous close point, wherein the previous state point is a point previous to the current state point on the trajectory of the current state point, wherein the previous close point is a point previous to the current close point on the trajectory of the current close point; and
predicting at least one future state point based on the first distance, the second distance, and the maximum Lyapunov exponent.

7. The system of claim 6, wherein the processor is configured to predict the at least one future state of the system based on a magnitude and a direction of the maximum Lyapunov exponent.

8. The system of claim 6, wherein the processor is configured to embed the time series data within the reconstructed phase space by performing at least the operations of
calculating a time delay factor;
calculating a minimum embedding dimension; and
embedding the time series data within the reconstructed phase space based on the time delay factor and minimum embedding dimension.

9. The system of claim 6, wherein the processor is configured to embed the time series data within the reconstructed phase space by calculating a minimum embedding dimension using a False Nearest Neighbors process.

10. The system of claim 6, wherein the processor is further configured to set the predicted at least one future state point as the current state point and predict at least one additional future state point based on the future state point set as the current state point and the rate of separation of trajectories of the embedded data within the reconstructed phase space.

11. A non-transitory computer-readable medium having instructions stored thereon, the instructions being executable by a processor to execute a method, the method comprising:
embedding time series data relating to a system within a reconstructed phase space to provide embedded data;
predicting at least one future state of the system based on a rate of separation of trajectories of the embedded data within the reconstructed phase space; and
evaluating a fitness of solutions associated with a plurality of individuals of a population for controlling the system using a fitness function, each individual comprising a dominant genotype and a recessive genotype, wherein each genotype represents a solution of the solutions associated with the plurality of individuals for controlling the system, wherein the fitness function is based on the at least one future state of the system and is applied to the dominant genotype of each individual;
wherein predicting the at least one future state of the system based on the rate of separation of trajectories of the embedded data within the reconstructed phase space comprises predicting the at least one future state of the system based on a maximum Lyapunov exponent associated with the embedded data within the reconstructed phase space;
wherein predicting the at least one future state of the system based on the maximum Lyapunov exponent comprises:
selecting a current state point from the reconstructed phase space;
identifying a current close point in a different trajectory than the current state point, wherein the current close point is within a predefined distance of the current state point in the reconstructed phase space;

calculating a first distance between the current state point and the current close point;

calculating a second distance between a previous state point and a previous close point, wherein the previous state point is a point previous to the current state point on the trajectory of the current state point, wherein the previous close point is a point previous to the current close point on the trajectory of the current close point; and predicting at least one future state point based on the first distance, the second distance, and the maximum Lyapunov exponent.

12. The non-transitory computer-readable medium of claim 11, wherein the at least one future state of the system is predicted based on a magnitude and a direction of the maximum Lyapunov exponent.

13. The non-transitory computer-readable medium of claim 11, wherein embedding the time series data within the reconstructed phase space comprises:

calculating a time delay factor;

calculating a minimum embedding dimension; and embedding the time series data within the reconstructed phase space based on the time delay factor and minimum embedding dimension.

14. The non-transitory computer-readable medium of claim 11, wherein embedding the time series data within the reconstructed phase space comprises calculating a minimum embedding dimension using a False Nearest Neighbors process.

* * * * *